May 21, 1940.  C. E. ANDREWS ET AL  2,201,822
PROCESS OF SEPARATING HYDROCARBON MIXTURES
Filed Oct. 22, 1938
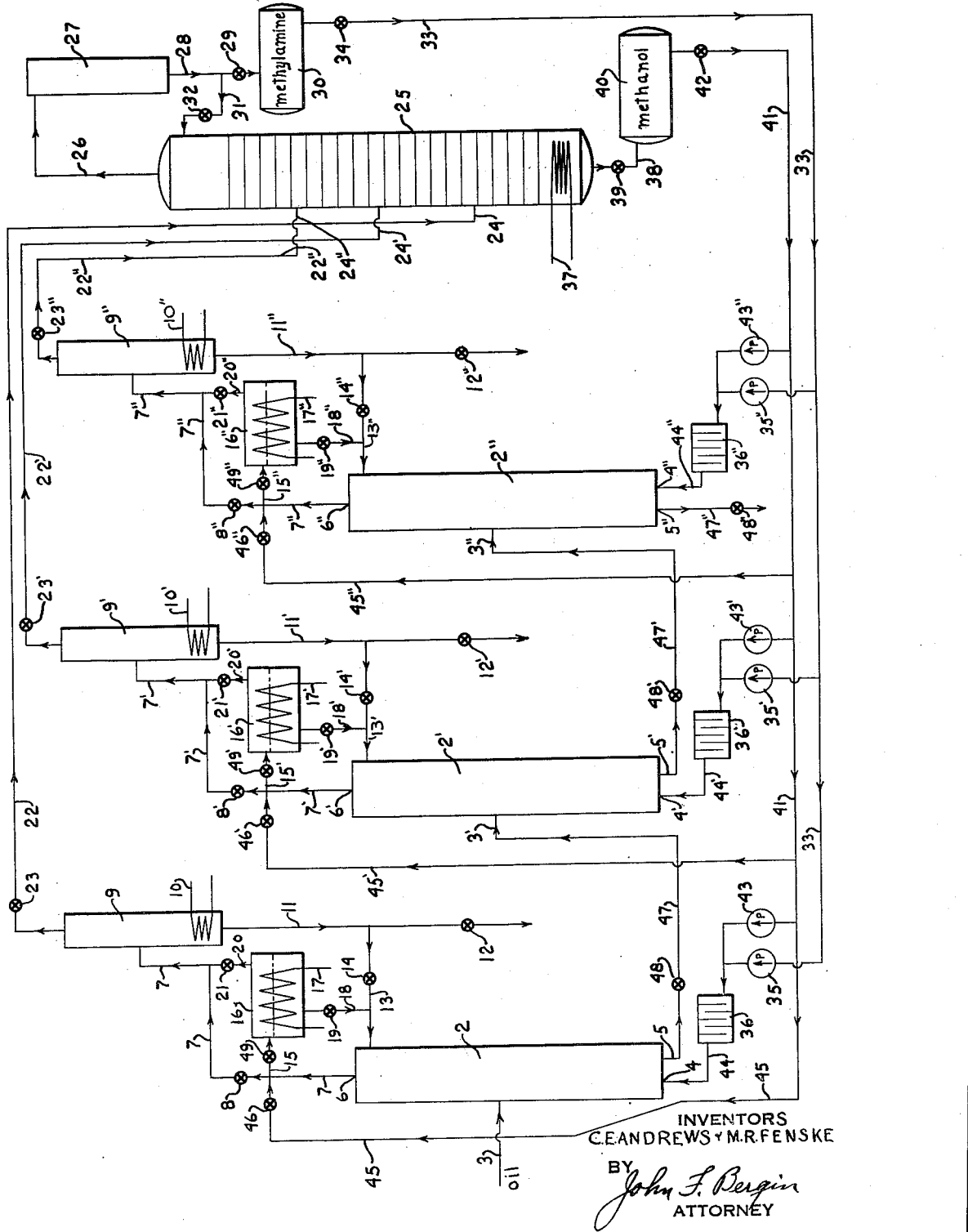
INVENTORS
C.E.ANDREWS & M.R.FENSKE
BY John F. Bergin
ATTORNEY Patented May 21, 1940

2,201,822

UNITED STATES PATENT OFFICE 2,201,822

PROCESS OF SEPARATING HYDROCARBON MIXTURES

Chester E. Andrews, Overbrook, and Merrell R. Fenske, State College, Pa., assignors to Röhm & Haas Company, Philadelphia, Pa.

Application October 22, 1938, Serial No. 236,414

6 Claims. (Cl. 196—13)

This invention relates to a process of separating mixtures of hydrocarbons, such as petroleum fractions, into fractions of different molecular type and different molecular size. More particularly it relates to a process of extracting such hydrocarbon mixtures in successive stages, employing in each stage a methylamine solvent having a greater dissolving capacity than the solvent used in the preceding stage.

This application is a continuation-in-part of our copending application Serial No. 155,432 filed July 24, 1937, which in turn is a continuation-in-part of our Patent No. 2,096,725 granted October 26, 1937.

Petroleum and the various fractions that are commonly obtained from it by distillation consist essentially of hydrocarbons of different molecular type and different molecular weight. The different types of hydrocarbons present in such mixtures may be classified generally into three classes. There are the more highly polar types or aromatics, the cycloaliphatics or naphthenes, and the aliphatics or paraffines. Most petroleum oils and their ordinary fractions contain two of these types and many of them contain all three. There may also be present compounds containing groups belonging to any two or all three of these classes but such compounds can generally be classified in accordance with the properties of the predominating group. Within each of these groups there are compounds of different molecular weights and which have different solubilities in the solvents employed in the present invention. Generally speaking, the compounds of low molecular weight in any group are more soluble than those of high molecular weight. For a given molecular weight the aromatic compounds are in general the most soluble and the paraffinic compounds the least soluble in any given solvent, the naphthenic compounds having an intermediate solubility.

The present invention is based on these varying solubility characteristics and on the fact that the dissolving capacity of the methylamine solvents employed can be varied at will over a wide range so that they are adaptable to practically any conditions it is desired to impose on the extraction process. These conditions comprise solvent to oil ratio, temperature, temperature gradient, and the type of extraction apparatus, i. e. whether it is a countercurrent tower or a series of mixers and settlers.

The dissolving capacity of the methylamine solvent can be varied by changing its composition or by changing the temperature. The three methylamines have different dissolving capacity for hydrocarbons. Trimethylamine is the strongest solvent for nearly all hydrocarbons, dimethylamine next and monomethylamine the weakest. Therefore by employing various mixtures of two or all three of the methylamines the dissolving capacity of the solvent can be varied over a rather wide range. This range may be extended in the direction of lower dissolving capacity by mixing with the methylamine a liquid, miscible therewith, which has a lower capacity for dissolving hydrocarbons. The methylamines may then be considered a primary solvent in which various amounts of a modifying solvent are dissolved. These modifying solvents are chemically inert toward the methylamines, are soluble in them, and possess a lower dissolving capacity for a particular hydrocarbon type than the methylamines. In the case of the methylamines these modifying solvents are one or more of the following substances: methanol and the low molecular weight alcohols, the lower aliphatic cyanides, water, ammonia, ethers, and ether-alcohols such as polyglycols and the monoalkyl-ethers of polyglycols. Of these the lower alcohols such as methanol and ethanol are particularly useful in the present invention. Methanol is a suitable liquid because of its low solvent power, ease of separation from the oils, low viscosity of its mixtures with the methylamines and ease of separation from the methylamines and recombination therewith to form any desired solvent mixture. Thus, in extracting a heavy petroleum oil, for example, the first solvent used would contain a larger proportion of methanol than the second one which in turn would contain more methanol than the third solvent.

The ratio of solvent to oil may also vary widely and will depend on the nature of the oil, the proportion of the various constituents thereof, and the size of the fraction to be separated. The ratio may vary between one and ten volumes of solvent per volume of oil being treated. For most practical operations, however, the ratio will be between two and four volumes of solvent per volume of oil. When successive extractions are carried out on the oil by solvents of graduated dissolving capacity, the ratio of solvent to oil may or may not be the same in each step, the actual ratio chosen being determined by various factors such as type of material being extracted, the proportion thereof in the oil and the specific solvent capacity of the solvent.

The primary object of the present invention is to provide a continuous process in which the oil to be treated is brought into contact with successive solvent mixtures containing methylamine, the dissolving capacity of each solvent mixture being greater than that of the one preceding it. In this manner the most readily soluble constituents of the oil are removed by the first solvent, the second solvent removes those of less solubility and the last those of still less solubility leaving as a residue or raffinate the constituents of the original oil which are practically insoluble in the final or strongest solvent mixture. Thus starting with a viscous petroleum fractions, for example, the dissolving capacity of the first solvent is adjusted so that it dissolves principally the aromatic compounds, the second solvent so that it dissolves principally the cycloparaffines and the third solvent so that it dissolves principally those hydrocarbons in the remaining mixture which have the lower molecular weights. There is, of course, no sharp line of demarcation between the solubilities of the various types and, since in all types the compounds of less molecular weight are more soluble than those of high molecular weight, there is bound to be some overlapping of solubilities.

The process is carried out in general as follows: The hydrocarbon mixture enters at a point between the top and bottom of a tower wherein it is brought in contact with the solvent which enters at the bottom when the solvent is lighter than the oil undergoing extraction. The tower may be of any suitable construction such, for example, as are shown in U. S. Patent 2,037,318; 2,037,319 and 2,052,971. However, it should be understood that while towers have been illustrated, other phase contacting means, such as a series of mixers and settlers, are applicable. In the first of a series of such towers the solvent chosen is one having a relatively low solvent capacity for the hydrocarbons and thus it can dissolve only the most easily soluble constituents of the oil. The solvent for purposes of illustration, is specifically lighter than the oil and methanol is selected as the modifying solvent. Consequently the solvent rises in the tower countercurrent to the oil which naturally flows downward. As the solvent passes through the oil, it extracts the more readily soluble constituents and the solution thus formed passes out at the top of the tower and is conducted to a still where the solvent is removed as a vapor. The vapor is then led to a fractionating column in which the methanol and methylamine are separated. Part of the extract remaining in the still is returned to the top of the tower to assist in the separation of the constituents of the original oil. The remainder of the extract is removed from the system. It contains the major part of the aromatic constituents of the original oil along with small amounts of the other less soluble material.

Other means may also be employed for separating the solvent and the extract. As the solution leaves the top of the extracting column, it may be led into a cooling device. The temperature of the solution is then lowered to a point at which some of the extract precipitates. Two phases are thus formed, the lighter one being rich in solvent, the heavier containing mostly material extracted from the oil. The solution phase then goes to the still where the solvent is removed and the residue removed from the system. The heavier phase is returned to the top of the extraction tower where it acts as a reflux. It extracts the less soluble components from the counterflowing solvent phase so that as the solvent phase flows toward the point where it leaves the extracting column the concentration of more soluble components in the solvent increases. Alternatively the solution leaving the extraction column may be mixed with a precipitant such as methanol. This precipitates the dissolved material in whole or in part according to the proportion of precipitant added. In general, the precipitants are the modifying solvents already described. Part of the precipitate is then returned to the top of the extraction column to extract countercurrently the solvent phase, and the remainder removed from the system. The solvent goes to the still where it is separated from any residual extract which is removed from the system, the vapor of solvent being led to the fractionating column where it is resolved into its components. In all cases the separation of solvent and extract is complete and part of the extract is returned to the extracting column where it acts as a reflux.

The oil phase which reaches the bottom of the tower is substantially free of aromatic compounds. It is removed from the bottom of the tower and conducted to a point intermediate the ends of a second tower where it meets a rising current of fresh solvent which has a higher dissolving capacity than had the solvent used in the first column. This solvent extracts more material from the oil, which in this case may be mostly cycloparaffinic compounds, and the solution thus formed passes out at the top of the column where it is treated according to any one of the methods described in connection with the operation of the first extraction column.

The oil phase which has now been subjected to two extractions is withdrawn from the bottom of the second tower and passed into a third tower at a point intermediate the ends where it meets an ascending current of a solvent having a greater dissolving capacity than the one used in the second column. Here the operations described for the first two towers are repeated. The extract probably contains some naphthenic hydrocarbons and some aliphatic ones having a lower molecular weight than those in the oil which passes out at the bottom of the tower and which consists predominantly of the aliphatic hydrocarbons having the highest molecular weight of those which were present in the original oil.

The original oil is thus separated into four fractions, three extracts and one raffinate, consisting essentially of aromatics in the first extract, cycloaliphatics in the second, low molecular weight aliphatics in the third and the highest molecular weight aliphatics in the raffinate. If further fractionation is desired, other towers operating as described above may be added to the system. Of course, the dissolving capacity of the extracting liquid used in each column will always be greater than that used in the preceding tower. The point where the oil is fed to the extraction tower, or feed point, is such that the composition of the oil in the tower corresponds as near as possible to that being fed to the tower.

The process may be carried out in any suitable apparatus, a convenient arrangement of which is shown diagrammatically in the accompanying drawing.

The apparatus consists of three extracting units arranged in series. Each unit consists of a tower 2 equipped with inlets 3 for the material to be tracted and 4 for the solvent and outlets 5 and 6 for the raffinate and extract respectively. Pipe 7 equipped with valve 8 leads from outlet 6 to still 9 in the bottom of which is a heater 10. Line 11 equipped with valve 12 leads from the bottom of the still and is connected through line 13 equipped with valve 14 to the top of tower 2. Connected with the line 7 is line 15 equipped with valve 49 which leads to separator 16 which is equipped with cooling coil 17. Line 18 equipped with valve 19 connects the bottom of the separator with line 13. Line 20 equipped with valve 21 connects the upper part of the separator with line 7. Line 22 equipped with valve 23 leads from the top of the still to point 24 in fractionating column 25. From the top of the fractionating column pipe 26 leads to reflux condenser 27, from the bottom of which pipe 28 equipped with valve 29 leads to receiver 30. Line 31 equipped with valve 32 connects the line 28 with the upper part of the fractionating column. From the bottom of the receiver line 33 equipped with valve 34 leads through pump 35 to mixer 36. Fractionating column 25 is equipped with a heater 37. From the bottom of this tower line 38 equipped with valve 39 leads into receiver 40. From the bottom of receiver 40 line 41 equipped with valve 42 leads through pump 43 to mixer 36. This mixer is connected with the bottom of the extraction tower 2 at inlet 4 by means of pipe 44. Line 45 equipped with valve 46 connects line 41 with line 7 at point between outlet 6 and valve 8.

The second and third units are constructed in the same manner, corresponding parts being designated by the same reference numbers to which are added prime or double prime marks to indicate the unit to which they belong.

Line 47, 47' equipped with valves 48, 48' connect outlets 5, 5' with the inlets 3', 3" of the extracting towers 2', 2". Line 47" equipped with valve 48" is connected with outlet 5" of extracting tower 2".

The operation of this apparatus will be described using, for purposes of illustration only, a heavy Pennsylvania residual oil as the mixture of hydrocarbons to be extracted and various mixtures of methylamine and methanol as the solvent. The methylamine is stored in receiver 30 and the methanol in receiver 40, from which they may be pumped in the proper proportions through metering pumps 35 and 43 into the mixer 36. The mixed solvent thus prepared enters the column 2 at inlet 4 where it meets a descending body of oil which has been introduced through inlet 3. The oil, being specifically heavier than the solvent, passes down through the solvent and the solvent passes up through the oil dissolving the more readily soluble constituents of the oil. The extract phase thus formed passes out through line 7 and valve 8 into still 9, valves 46, 49, 21 and 19 being closed during this operation. The solution is then heated in the still so that the solvent is all evaporated and passes off through line 22 to the fractionating column 25. The residue left in the still is withdrawn through pipe 11, valves 12 and 14 being adjusted so that part of the residue passes out of the system through valve 12 and the remainder returns to the top of tower 2 through line 13. In this manner part of the extract may be used as a reflux to assist in separating the constituents of the oil being extracted. In stead of passing the extract phase directly into the still it may first be passed through the separator 16 where it is cooled by means of cooling coil 17 to such a degree that part at least of the extracted material precipitates. In this operation valves 46 and 8 are closed and 14, 49, 19 and 21 are open. This precipitate is led through line 18 into line 13 where part of it may be returned to the top of column 2 and part withdrawn through valve 12, valve 14 being adjusted so as to regulate the amounts of extract returning to the column and of that withdrawn from the system. The solution phase formed in separator 16 passes through line 20 into line 7 and thence into the still 9 where the solvent is removed and the residue withdrawn as described above.

Instead of reducing the temperature of the extract phase to precipitate part of the extract, this may be accomplished by adding a precipitant, for example methanol, to the extract phase. This may be done by pumping methanol through line 45 and valve 46 into line 7, valve 8 being closed, and thence into the separator 16. The precipitate and solvent phases thus formed are treated in the manner described above.

The raffinate passing downwards in extraction column 2 is led by means of pipe 47 to the inlet 3' of extraction column 2' and fresh solvent of higher solvent capacity than that used in column 2 enters at inlet 4' and rises through the column. The extract phase leaves the top of the column at outlet 6' and may then be treated in any one of the three ways described in connection with the operation of extraction column 2. The raffinate from column 2' is then led through line 47' to inlet 3" of column 2" where the operation of the extraction tower 2' is repeated, fresh solvent of higher solvent capacity than that in column 2' entering this column at 4". The final raffinate is withdrawn from column 2" through line 47" and valve 48". The solvent vapors distilled from stills 9, 9', 9" are conducted to the fractionating column 25 through lines 22, 22', 22" respectively. Here the mixture of methanol and methylamine is fractionated, the methylamine being collected in receiver 30 and the methanol in receiver 40.

In this manner the oil is separated into four fractions, three extracts and one raffinate. The extracts are removed from the system through valves 12, 12', 12" and the final raffinate through valve 48".

As mentioned above, an oil of the type indicated above generally contains three classes of compounds, aromatic, hydro-aromatic or naphthenic, and aliphatic. The aromatic compounds are the most readily soluble and are, therefore, extracted with the weakest solvent in column 2. The hydroaromatic or naphthenic are less soluble and, therefore, a stronger solvent such as used in column 2' is necessary to extract them. The oil entering column 2" consists principally of aliphatic compounds and is separated into two aliphatic fractions, one of high molecular weight which is the raffinate and one of lower molecular weight which is the extract.

A Pennsylvania Bright Stock was extracted in the foregoing manner and separated into four fractions. The solvent mixture employed in the first unit contained 75% technical monomethylamine and 25% methanol. In the second unit an 85/15 mixture was used and in the third a 95/5 mixture. The following table gives the viscosity characteristics of the three extracts and the raffinate in comparison with those of the original oil.

|  | Percent extract | Visc. 100° F. | Visc. 210° F. | Visc. index |
|---|---|---|---|---|
| Original oil |  | 2690 | 156.9 | 95 |
| Extract #1 | 18 | 3165 | 123.8 | 38 |
| Extract 2 | 18.9 | 953 | 81.9 | 85 |
| Extract 3 | 22.2 | 1092 | 94.5 | 98 |
| Raffinate | 40.9 | 6870 | 323 | 105 |

It is seen from these results that the most soluble fraction, Extract #1, contains compounds, probably mostly of aromatic nature, which have a low viscosity index. The next fraction has a higher viscosity index but still not the equal of that of the original oil. The third extract has a viscosity index somewhat greater than that of the original bright stock and probably contains a large proportion of the lower molecular weight aliphatic hydrocarbons originally present. The raffinate is an oil of very high viscosity having a viscosity index considerably higher than that of the starting material. It probably consists almost entirely of the high molecular weight aliphatic hydrocarbons.

In carrying out the process the entire system is kept under pressure which is determined principally by the temperature at which the extractions are performed. This pressure is usually great enough to condense the methylamines at ordinary temperature so that no refrigeration or extra cold cooling water is required in the condenser.

The temperature of the extraction steps may be varied to suit conditions. It is advantageous, however, to have the temperature of the liquid at the bottom of the extraction towers somewhat higher than that at the top. More particularly, it is desirable to have a drop in temperature in the direction of solvent flow. The temperature drop through the tower may be as much as 100° to 200° F. if desired, and can be regulated by adjusting the temperature of the incoming oil and solvent, as well as by suitably arranged heating and cooling units. It is also advantageous to operate at a somewhat elevated temperature, say 100–170° F. At the higher temperatures the viscosity of the liquids is considerably reduced which facilitates the flow through the system and favors more efficient extraction. It is also of advantage to have a fairly high temperature when using the procedure according to which part of the extract is precipitated in the separators 16 by cooling. Thus, by being able to adjust the dissolving power of the methylamine solvent by the modifying solvent, it is possible to have optimum conditions for extraction. With ordinary extraction solvents, the dissolving power of the solvent may only be adjusted by temperatures, but in so doing other factors are simultaneously affected, frequently in an undesirable way.

It is often advantageous to mix the oil to be extracted with lighter, less viscous paraffinic type hydrocarbons, particularly the lower petroleum fractions such as naphtha or kerosene which can subsequently be removed from the raffinate by evaporation at relative low temperatures. This is particularly advantageous in treating very viscous oils or oils which on extraction yield fractions of very high viscosity. The lighter hydrocarbon reduces the vicosity of the heavy oil, thus facilitating its flow through the system and making it more easily accessible to the action of the methylamine solvent. The amount of light hydrocarbon added can be varied over a rather wide range, for example from 1 to 3 volumes of diluent to 10 volumes of oil. The actual amount used will naturally depend on the properties of the oil being treated, the desired reduction in viscosity and the composition of the solvent being used. The diluent may be added before the oil enters the extraction system or at a later stage. For example, if the initial oil is not very viscous and can be treated without dilution in the first tower but yields a very viscous raffinate in the second tower, the diluent may be added as the oil enters the third tower. Of course, if conditions require, it may be mixed with the oil entering the second tower.

For extracting materials of low viscosity and low molecular weight such as gasolines, methylamine-water solutions are effective solvents. In some cases these solvents may be heavier, rather than lighter, than the mixture being extracted. But the same methods of operation and the same principles apply, and essentially all that is needed to visualize the flow in cases of solvents heavier than the mixture being extracted is to turn the apparatus in the drawing end for end. That is, the same operations are conducted on the solvent solutions whether the solvent is lighter or heavier than the hydrocarbon mixture being extracted.

We claim:

1. The process of separating mixtures of hydrocarbons containing molecules of different types and weights, which comprises treating said mixture with a solvent composed of at least one methylamine and a modifying solvent, the dissolving capacity of said solvent being so adjusted that it dissolves predominantly aromatic hydrocarbons, separating an extract and a raffinate, treating said raffinate with a second solvent composed of at least one methylamine and a modifying solvent but containing a greater proportion of methylamine than the first solvent and being capable of dissolving predominantly naphthenic hydrocarbons, separating a second extract and a second raffinate, treating said second raffinate with a solvent composed of at least one methylamine and a modifying solvent but containing a greater proportion of methylamine than the second solvent and being capable of dissolving predominantly paraffinic hydrocarbons of lower molecular weight range, separating a third extract and a third raffinate which contains predominantly paraffinic hydrocarbons of higher molecular weight range.

2. The process of separating mixtures of hydrocarbons which contain molecules of different types and weights, which comprises treating said mixture with a solvent composed of at least one methylamine and methanol, the dissolving capacity of said solvent being so adjusted that it dissolves predominantly aromatic hydrocarbons, separating an extract and a raffinate, treating said raffinate with a second solvent composed of at least one methylamine and methanol but containing a greater proportion of methylamine than the first solvent and being capable of dissolving predominantly naphthenic hydrocarbons, separating a second extract and a second raffinate, treating said second raffinate with a solvent composed of at least one methylamine and methanol but containing a greater proportion of methylamine than the second solvent and being capable of dissolving predominantly paraffinic hydrocarbons of lower molecular weight range, separating a third extract and a third raffinate which contains predominantly paraffinic hydrocarbons of higher molecular weight range.

3. The process of separating mixtures of hydrocarbons which contain molecules of different types and weights, which comprises treating said mixture with a solvent composed of at least one methylamine and ammonia, the dissolving capacity of said solvent being so adjusted that it dissolves predominantly aromatic hydrocarbons, separating an extract and a raffinate, treating said raffinate with a second solvent composed of at least one methylamine and ammonia but containing a greater proportion of methylamine than the first solvent and being capable of dissolving predominantly naphthenic hydrocarbons, separating a second extract and a second raffinate, treating said second raffinate with a solvent composed of at least one methylamine and ammonia but containing a greater proportion of methylamine than the second solvent and being capable of dissolving predominantly paraffinic hydrocarbons of lower molecular weight range, separating a third extract and a third raffinate which contains predominantly paraffinic hydrocarbons of high molecular range.

4. The process of separating a heavy lubricating oil into fractions, which comprises treating the oil with a solvent containing about 75% of the monomethylamine and about 25% of a modifying solvent, said solvent being capable of dissolving predominantly the armatic hydrocarbons contained in said oil, separating an extract and a raffinate, treating the raffinate with a second solvent containing about 85% of monomethylamine and about 15% of a modifying solvent, said second solvent being capable of dissolving predominantly naphthenic hydrocarbons, separating a second extract and a second raffinate, treating said second raffinate with a third solvent containing about 95% of monomethylamine and about 5% of a modifying solvent, said third solvent being capable of dissolving predominantly paraffinic hydrocarbons of lower molecular weight range, separating a final extract and a final raffinate which contains predominantly paraffinic hydrocarbons of higher molecular weight range.

5. The process of separating a heavy lubricating oil into fractions, which comprises treating the oil with a solvent containing about 75% of monomethylamine and about 25% of methanol which is capable of dissolving predominantly the aromatic hydrocarbons contained in said oil, separating an extract and a raffinate, treating the raffinate with a second solvent containing about 85% of monomethylamine and about 15% of methanol capable of dissolving predominantly naphthenic hydrocarbons, separating a second extract and a second raffinate, treating said second raffinate with a third solvent containing about 95% of monomethylamine and about 5% of methanol capable of dissolving predominantly paraffinic hydrocarbons of lower molecular weight range, separating a final extract and a final raffinate which contains predominantly paraffinic hydrocarbons of higher molecular weight range.

6. The process of separating mixtures of hydrocarbons containing molecules of different types and sizes, which comprises treating said mixture in stages with a series of solvents composed of at least one methylamine and a modifying solvent, separating an extract and a raffinate in each stage and treating each raffinate with one of said series of solvents containing a greater proportion of methylamine than the solvent employed in the preceding stage, the dissolving capacities of the solvents being so adjusted that the first ones dissolve predominantly aromatic hydrocarbons, the intermediate ones predominantly naphthenic hydrocarbons, and the final ones predominantly paraffinic hydrocarbons of lower molecular weight range.

CHESTER E. ANDREWS.
MERRELL R. FENSKE.